United States Patent [19]
Shields et al.

[11] Patent Number: 5,949,418
[45] Date of Patent: Sep. 7, 1999

[54] OPERATING SYSTEM FOR HANDHELD COMPUTING DEVICE HAVING GRAPHICAL WINDOW MINIMIZATION/ENLARGEMENT FUNCTIONALITY

[75] Inventors: Kevin Timothy Shields, Redmond; Anthony Kitowicz, Kirkland; Daniel Boone; Scott R. Shell, both of Redmond, all of Wash.

[73] Assignee: Microsoft Corporation, Redmond, Wash.

[21] Appl. No.: 08/851,629

[22] Filed: May 6, 1997

[51] Int. Cl.⁶ .......................................................... G06F 3/14
[52] U.S. Cl. ............................................. 345/342; 345/348
[58] Field of Search ...................................... 345/342, 339, 345/340, 348, 354, 347, 343, 173; 395/682

[56] References Cited

U.S. PATENT DOCUMENTS

| | | | |
|---|---|---|---|
| 5,227,771 | 7/1993 | Kerr et al. | 345/340 |
| 5,617,526 | 4/1997 | Oran et al. | 345/326 |
| 5,699,535 | 12/1997 | Amro et al. | 345/342 |
| 5,704,050 | 12/1997 | Redpath | 345/339 |
| 5,757,371 | 5/1998 | Oran et al. | 345/348 |

*Primary Examiner*—Matthew M. Kim
*Assistant Examiner*—Crescelle N. dela Torre
*Attorney, Agent, or Firm*—Lee & Hayes, PLLC

[57] ABSTRACT

A portable computing device has a processor and a touch-sensitive display. The display includes a touch-sensitive area superimposed on a viewing area, whereby the touch-sensitive area extends beyond the viewing area to form a border outside of the viewing area but within the touch-sensitive area. The handheld computing device has an operating system which executes on the processor to provide a graphical user interface environment capable of presenting a graphical window and a program taskbar within the viewing area. The program taskbar presents a program icon representing a program that is active within the graphical window. The operating system is configured to minimize the graphical window to remove the graphical window from the viewing area or to enlarge the graphical window to restore the graphical window in the viewing area in response to contacting the program icon.

9 Claims, 3 Drawing Sheets

OPERATING SYSTEM FOR HANDHELD COMPUTING DEVICE HAVING GRAPHICAL WINDOW MINIMIZATION/ENLARGEMENT FUNCTIONALITY

TECHNICAL FIELD

This invention relates to computing devices, and particularly to handheld computing devices.

BACKGROUND OF THE INVENTION

Small, handheld computing devices have been steadily growing in popularity in recent years. The devices go by different names, including palmtops, pocket computers, personal digital assistants, personal organizers, and the like. In this disclosure, this class of computing devices is generally referred to as "handheld personal computers", "handheld PCs", or "H/PCs".

H/PCs are small, pocket-sized devices having an LCD (liquid crystal display) with a touch-sensitive screen, a stylus to enter data through the screen, and an input device such as a keypad or miniature QWERTY keyboard. H/PCs have a microprocessor, memory, and are capable of running an operating system and one or more applications on the operating system. Microsoft Corporation recently released the Windows® CE operating system for use on H/PCs, which is a scaled-down version of its popular Windows® operating systems manufactured for personal computers.

One of the most desirable characteristics of H/PCs is their portability. The compact, portable H/PCs provide a user with real computer-like applications—such as email, PIM (personal information management), Internet browser, spreadsheet, word processing. A traveling user can receive email messages, schedule meetings or appointments, and browse the Internet from the H/PC.

Chief among the design compromises is an undersized display. Screen space is very limited. Traditional user interface techniques which users are accustomed to on desktop computers are not available for H/PC displays due to the limited size. Additionally, the screen must be efficiently utilized to enable effective data input from the stylus.

In view of this design constraint, it would be advantageous to develop user interfaces that can be effectively employed on the miniaturized screen of a handheld computing device.

SUMMARY OF THE INVENTION

This invention concerns a computing device having an operating system with improved user interfaces for miniaturized screens.

The computing device has a processor and a touch-sensitive display. The computing device has an operating system that executes on the processor to provide a graphical user interface environment capable of presenting a graphical window and a program taskbar within the viewing area. The program taskbar presents a program icon representing a program that is active within the graphical window.

The operating system is configured to minimize the graphical window to remove it from the viewing area, or alternatively to enlarge the graphical window to restore it in the viewing area, in response to contacting the program icon in the taskbar. That is, when the window is viewable, the user taps the program icon with the stylus to minimize the graphical window. Conversely, when the window is minimized, the user taps the program icon to enlarge the graphical window.

BRIEF DESCRIPTION OF THE DRAWINGS

The same reference numbers are used throughout the drawings to reference like components and features.

FIG. 3 shows a taskbar user interface presented within a viewing area of the display.

DETAILED DESCRIPTION OF THE PREFERRED EMBODIMENT

Figure 1:
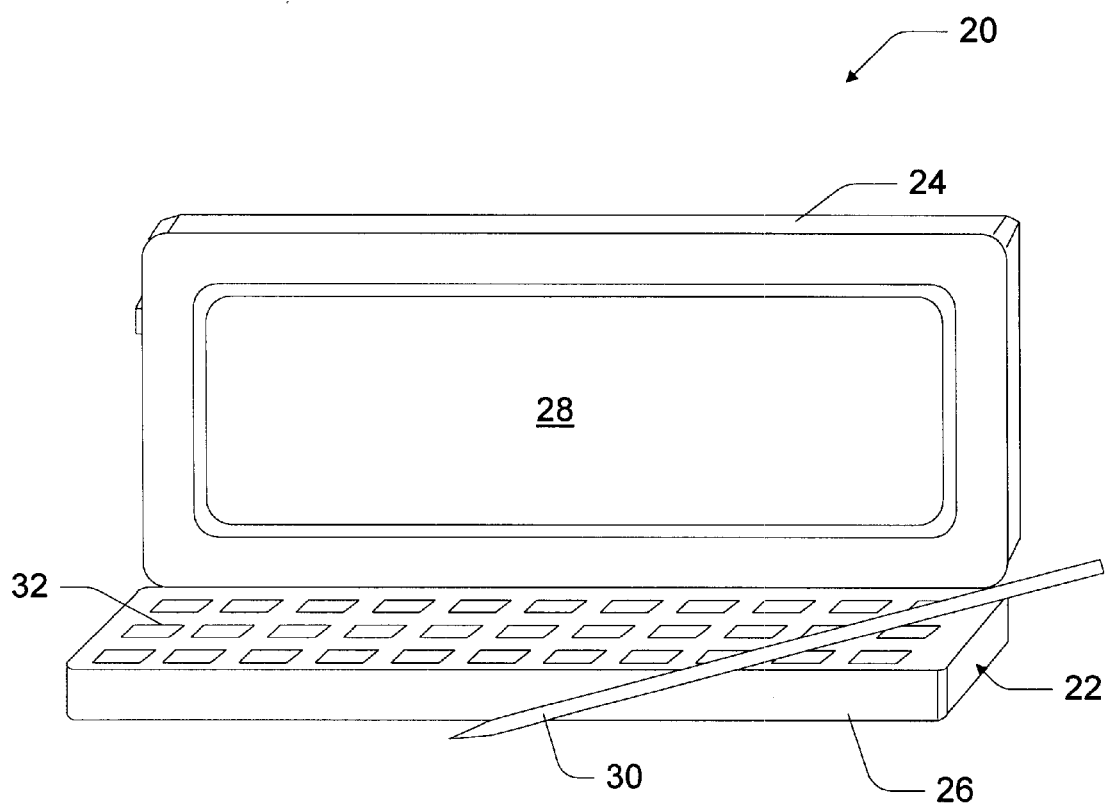
FIG. 1 is a perspective view of a handheld computing device in an open position.

FIG. 1 shows a computing device implemented as a handheld computing device 20. As used herein, "handheld computing device" means a small computing device having a processing unit that is capable of running one or more application programs, a display, and an input mechanism such as a keypad, a touch-sensitive screen, a track ball, a touch-sensitive pad, a miniaturized QWERTY keyboard, or the like.

The handheld computing device 20 is embodied as a handheld personal computer. The terms "handheld computing device" and "handheld personal computer" (or handheld PC or H/PC) are used interchangeably throughout this disclosure. However, in other implementations, the handheld computing device may be implemented as a personal digital assistant (PDA), a personal organizer, a palmtop computer, a computerized notepad, or the like. The invention can also be implemented in other types of computers and computer-like or computer-controlled devices having a graphical display.

Computing device 20 has a casing 22 with a cover or lid 24 and a base 26. The handheld computing device 20 has a liquid crystal display (LCD) 28 with a touch-sensitive screen mounted to the lid 24. The lid 24 is hingedly connected to the base 26 to pivot between an open position, which exposes display 28, and a closed position, which protects the display. The device is equipped with a stylus 30 to enter data through the touchscreen display 28 and a miniature QWERTY keyboard 32. The stylus 30 and keyboard 32 are both mounted in base 26.

The handheld computing device 20 can also be implemented with a wireless transceiver (not shown) such as an IR (infrared) transceiver and/or an RF (radio frequency) transceiver. Although the illustrated implementation shows a two-member H/PC 20 with a lid 24 and a base 26, other implementations of the H/PC Might comprise an integrated body without hinged components, as is the case with computerized notepads (e.g., Newton® from Apple Computers).

Figure 2:
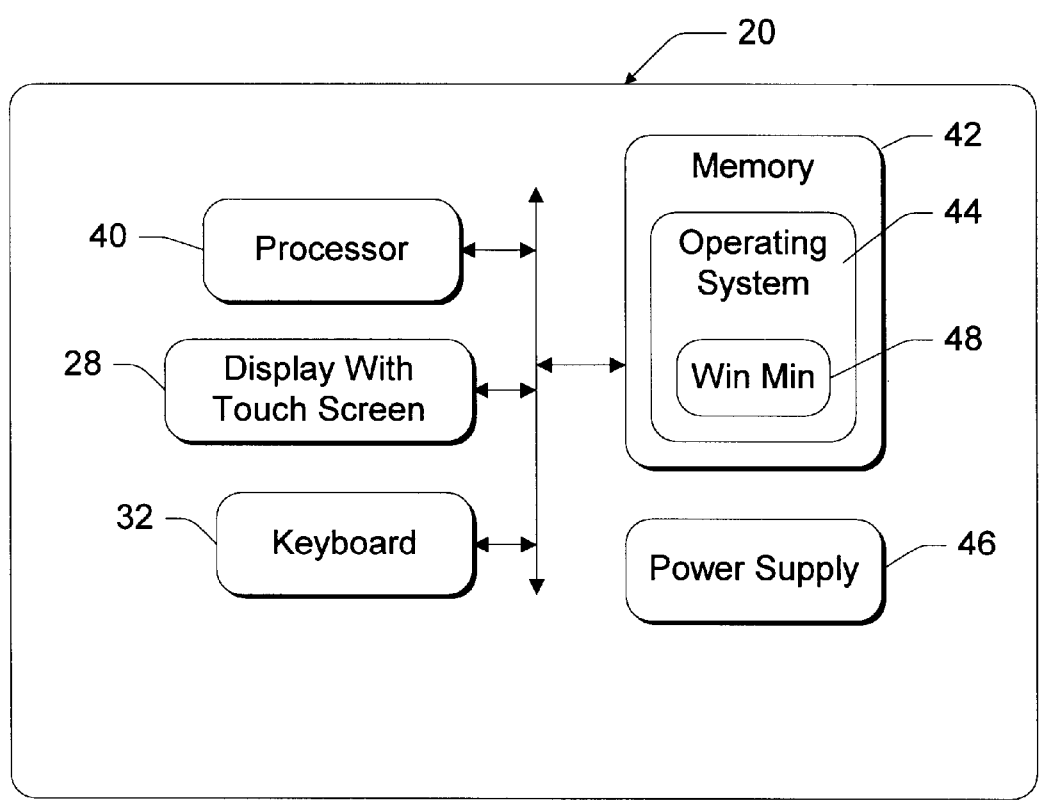
FIG. 2 is a block diagram of the handheld computing device.

FIG. 2 shows functional components of the handheld computing device 20. It has a processor 40, a memory 42, a display 28, and a keyboard 32. The memory 42 generally includes both volatile memory (e.g., RAM) and non-volatile memory (e.g., ROM, PCMCIA cards, etc.). An operating system 44 is resident in the memory 42 and executes on the processor 40. The operating system 44 is a multitasking operating system that allows simultaneous execution of multiple applications. The operating system employs a graphical user interface windowing environment that presents applications and documents in specially delineated areas of the display screen called "windows." Each window can act independently, including its own menu, toolbar, pointers, and other controls, as if it were a virtual display device. It is noted, however, that the computing device may be implemented with other types of operating systems that support a window environment.

The operating system 44 is preferably the Windows® CE operating system from Microsoft Corporation that is configured to include the "window minimization" feature discussed below, as represented by the window minimization (win min) manager 48. The Windows® CE operating system is a derivative of Windows® brand operating systems, such as Windows® 95, that is especially designed for handheld computing devices.

The H/PC 20 has a power supply 46 that supplies power to the electronic components. The power supply 46 is preferably implemented as one or more batteries. The power supply 46 might further represent an external power source that overrides or recharges the built-in batteries, such as an AC adapter or a powered docking cradle.

Figure 3:
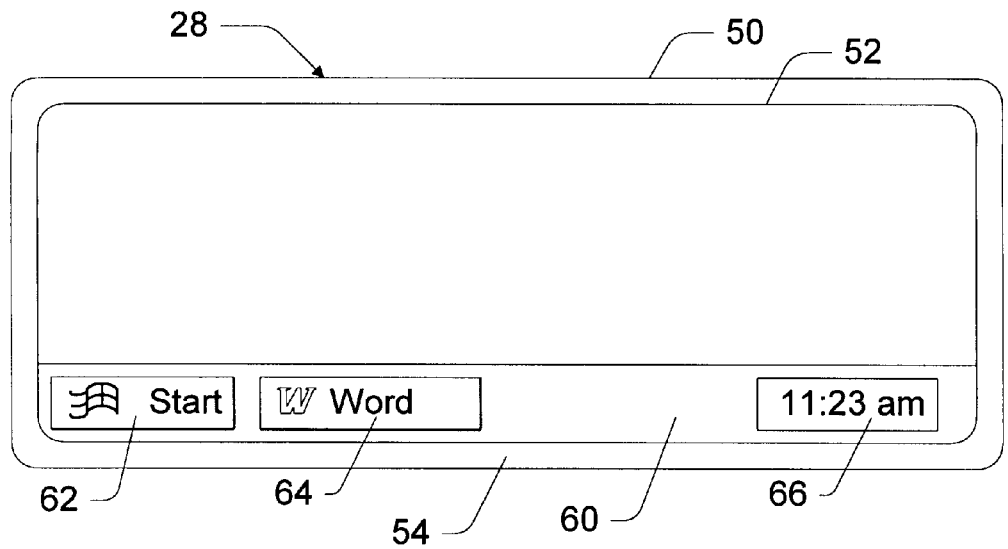
FIG. 3 is a diagrammatic illustration of a touch-sensitive display utilized in the handheld computing device.

FIG. 3 shows the LCD 28 in more detail. It comprises a touch-sensitive screen having a touch-sensitive area 50 superimposed on a viewing area 52. The touch-sensitive area 50 extends slightly beyond the viewing area 52 to form a border 54. The border 54 is inside the touch-sensitive area 50 and responsive to touch contact from the stylus, but is outside of the viewing area 52. The border 54 may surround the viewing area 52, as shown in FIG. 3, or run along one or more sides of the viewing area.

The LCD 28 has a taskbar 60 along the bottom of viewing area 52. The taskbar UI 60 resembles the familiar taskbar of the Windows® 95 operating system. It presents the "Start" button 62 and active application icons, as represented by the "Word" button 64 for the word processing program manufactured and sold by Microsoft Corporation under the trademark Word. The taskbar UI 60 also has a time/date area 66.

It is noted that the Word button 64 is shown for example purposes, and buttons for different or additional programs may be displayed in the taskbar UI 60. Furthermore, the button may be configured to have a different graphical appearance other than the rectangular shape shown in FIG. 3.

Figure 4:
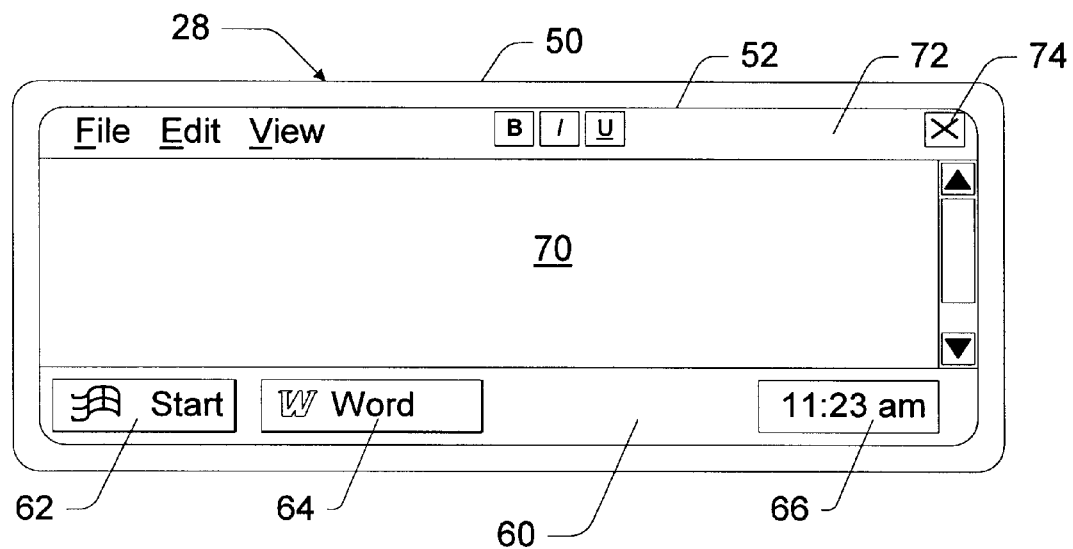
FIG. 4 is a diagrammatic illustration of a graphical window presented above the taskbar and within the viewing area of the display.

FIG. 4 shows the LCD 28 with an active application window 70 on the viewing area 52. In this example, the application window 70 is a graphical user interface for the word processing program sold under the trademark Word. The user interface window 70 contains a tool bar 72 with a close window button 74 in the upper right hand corner. Due to screen size constraints of the LCD 28, the window 70 does not appear as an independent framed unit, as is customary in the user interface of the Windows® 95 operating system. Instead, the window 70 appears to consume the entire viewing area above the taskbar 60. In other implementations, the window 70 might appear as an independent framed unit.

One feature in the popular Windows® 95 operating system is the "window minimize" feature. Windows can be minimized and removed from the primary viewing area of the display by moving the mouse pointer to a "minimize" button in the upper right hand corner of the window and clicking on the minimize button. The minimize button is represented as a square containing a flat line "_" near the bottom. The window is removed from the screen and represented as an icon, typically in the form of an application button, at the bottom of the screen. The user can move the icon to different areas of the screen as desired for screen management. When the user wants to see the window again, the user clicks on the application button and then clicks on an "enlarge" button next to the minimize button to return the window to its normal size. The minimize and enlarge buttons are positioned beside the close window button, which is represented as a square with an "X".

Due to limited screen space, handheld PCs do not support a mouse pointer nor the minimize and enlarge buttons in the graphical window. Notice in FIG. 4 that the user interface window 70 does not support a minimize button or an enlarge button. Accordingly, the conventional technique for implementing the "window minimize" feature cannot be imported to the operating system 44 of the H/PC.

An aspect of this invention pertains to a new user interface for achieving the "window minimize" feature in a handheld PC. As shown in FIG. 2, the operating system 44 has a window minimize (win min) manager 48 that controls minimizing and enlarging the window.

To alternately minimize and enlarge a graphical window, the user taps the button in taskbar 60 that corresponds to window. In this example, the window 70 contains the Word program, and hence the user taps the corresponding "Word" button 64 in the taskbar 60. The window minimize manager 48 of the operating system 44 interprets this input to either minimize or enlarge the window 70 associated with the button 64, depending upon the present state of the window.

More particularly, when the window is active and viewable (FIG. 4), tapping the "Word" button 64 minimizes the window 70 to remove it entirely from the screen, as is shown in FIG. 3. In this state, the button 64 graphically appears undepressed and lacking focus. When the window is active and minimized (i.e., not viewable on the screen), tapping the "Word" button 64 restores the window to full screen, as shown in FIG. 4. In this state, the button 64 graphically appears depressed as having focus.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A computing device comprising:

a processor;

a display;

an operating system executing on the processor to provide a graphical user interface environment capable of presenting a graphical window and a program taskbar on the display, the program taskbar having a program icon representing a program active within the graphical window; and the operating system being configured to minimize the graphical window to remove the graphical window from the display in direct response to actuating the program icon with single contact.

2. A computing device as recited in claim 1, wherein the operating system is configured to enlarge the graphical window to restore the graphical window on the display in response to actuating the program icon.

3. A computing device as recited in claim 1, wherein the display is a touch-sensitive display and the operating system is configured to minimize or enlarge the graphical window on the display in response to contacting the program icon.

4. For a computing device having a touch-sensitive screen, an operating system embodied on a computer-readable medium to provide a graphical user interface environment capable of presenting a graphical window and a program taskbar on the screen, the program taskbar having a program icon representing a program active within the graphical window, the operating system being configured to alternately, in response to contact of the program icon, (1) minimize the graphical window to remove the graphical window from the viewing area and (2) enlarge the graphical window to return the graphical window to the viewing area.

5. A method for operating a computing device having a touch-sensitive display, comprising the following steps:

presenting a graphical user interface environment within a viewing area of the touch-sensitive display, the graphical user interface environment supporting a graphical window and a program taskbar;

showing a program icon within the program taskbar that represents a program active within the graphical window; and alternately minimizing and enlarging the program window in direct response to single contact of the program icon.

6. An operating system embodied on a computer-readable medium having computer-executable instructions for performing the steps of the method as recited in claim 5.

7. A computer-readable medium having computer-executable instructions for performing the steps of the method as recited in claim 5.

8. A handheld computing device, comprising:

a processor;

a touch-sensitive LCD display;

an operating system executing on the processor to provide a graphical user interface environment capable of presenting a graphical window and a program taskbar on the touch-sensitive LCD display, the program taskbar having a program icon representing a program active within the graphical window; and the operating system being configured to minimize the graphical window to remove the graphical window from the touch-sensitive LCD display in response to contacting the program icon.

9. A handheld computing device as recited in claim 8, wherein the operating system is configured to enlarge the graphical window to restore the graphical window on the touch-sensitive LCD display in response to contacting the program icon.

\* \* \* \* \*